(12) United States Patent
Allemand

(10) Patent No.: US 8,061,051 B2
(45) Date of Patent: Nov. 22, 2011

(54) CLAMPING LEVEL TOOL

(75) Inventor: James S. Allemand, Mokena, IL (US)

(73) Assignee: Swanson Tool Company, Inc., Frankfort, IL (US)

( * ) Notice: Subject to any disclaimer, the term of this patent is extended or adjusted under 35 U.S.C. 154(b) by 201 days.

(21) Appl. No.: 12/114,319

(22) Filed: May 2, 2008

(65) Prior Publication Data

US 2008/0271331 A1    Nov. 6, 2008

Related U.S. Application Data

(60) Provisional application No. 60/927,661, filed on May 4, 2007.

(51) Int. Cl.
*G01C 9/00* (2006.01)
(52) U.S. Cl. .............. 33/371; 33/370; D10/69
(58) Field of Classification Search ............ 33/370–373; D10/69
See application file for complete search history.

(56) References Cited

U.S. PATENT DOCUMENTS

| | | | | |
|---|---|---|---|---|
| 2,419,941 A | * | 5/1947 | Belzung | 33/371 |
| 3,435,533 A | * | 4/1969 | Whitfield | 33/347 |
| 4,274,208 A | * | 6/1981 | Yakkel | 33/371 |
| 4,394,799 A | * | 7/1983 | Moree et al. | 33/343 |
| 5,058,407 A | * | 10/1991 | Parker | 72/37 |
| 5,135,209 A | | 8/1992 | Penny | |
| 5,402,579 A | * | 4/1995 | Smith | 33/354 |
| D409,100 S | * | 5/1999 | Brimer | D10/69 |
| 6,026,581 A | | 2/2000 | Gruetzmacher | |
| D463,298 S | * | 9/2002 | Webb | D10/69 |
| 6,839,973 B1 | | 1/2005 | Woodward | |
| D509,158 S | | 9/2005 | Silberberg | |
| 7,117,606 B2 | | 10/2006 | Brown | |
| D538,186 S | * | 3/2007 | Silberberg | D10/69 |
| D539,679 S | * | 4/2007 | Silberberg | D10/69 |

OTHER PUBLICATIONS

PCT International Search Report/Written Opinion of the International Searching Authority (the European Patent Office) regarding Application No. PCT/US08/62431, dated Aug. 6, 2008, 8 pages.

* cited by examiner

*Primary Examiner* — Brad Bennett
*Assistant Examiner* — Tania Courson
(74) *Attorney, Agent, or Firm* — Brinks Hofer Gilson & Lione

(57) ABSTRACT

A level tool comprising a body and a clamping portion disposed at one end of the body. The clamping portion includes a first arm having a plurality of spaced-apart contact surfaces and a second arm having a fastening member. The first and second arms define an opening for receiving a portion of a workpiece. The plurality of spaced-apart contact surfaces and the fastening member cooperate to releasably clamp the portion of the workpiece received in the opening.

20 Claims, 3 Drawing Sheets

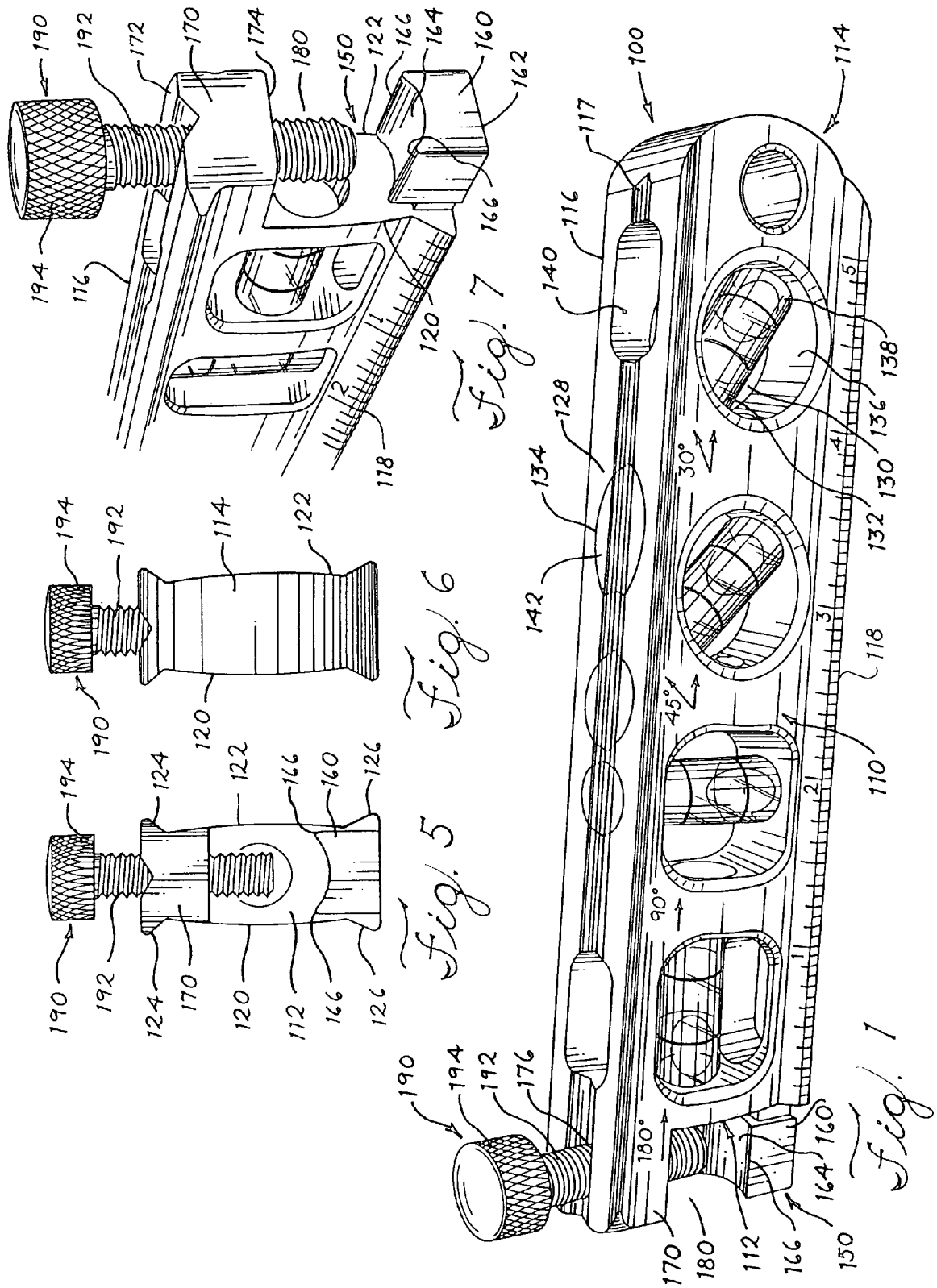

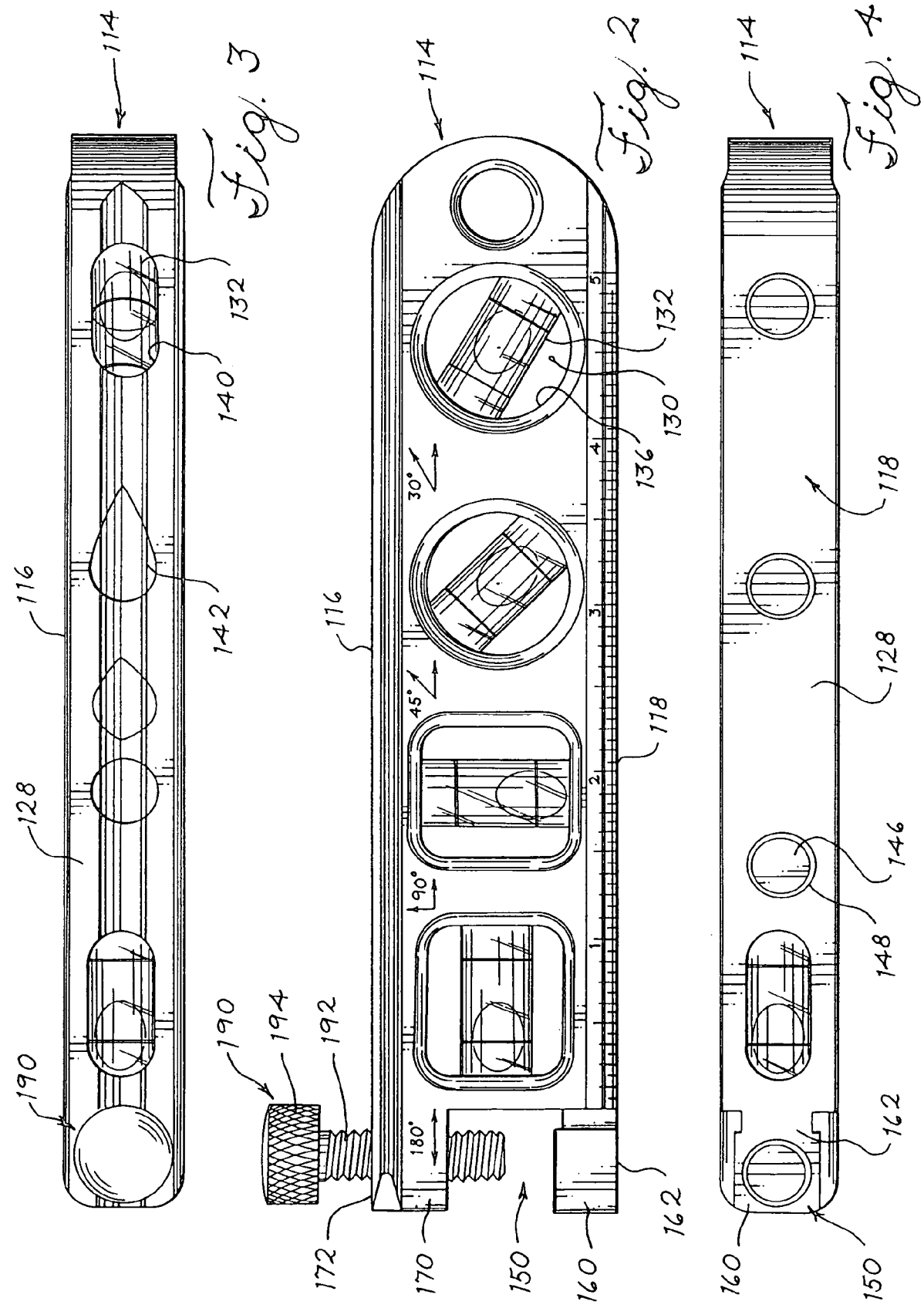

CLAMPING LEVEL TOOL

RELATED APPLICATIONS

The present patent document claims the benefit of the filing date under 35 U.S.C. §119(e) of Provisional U.S. Patent Application Ser. No. 60/927,661, filed May 4, 2007, which is hereby incorporated by reference.

BACKGROUND

The invention relates generally to a level tool for indicating the orientation of a workpiece. More specifically, the invention relates to a level tool configured to clamp to a workpiece.

As is known in the art, level tools are used to indicate the orientation of a workpiece, a surface or a structure with respect to a reference axis, such as a horizontal reference axis that is generally parallel to the horizon, a vertical reference axis that is perpendicular to the horizontal axis and is generally aligned with the direction of the force of gravity, or a reference axis having another orientation.

A typical level tool generally includes an elongated body that defines at least one external working surface and one or more vial openings with bubble vials secured therein. The vials may be aligned in different directions relative to the working surface for indicating the orientation of a workpiece. For example, a plumb vial may be aligned in a direction perpendicular to the working surface, and a level vial may be aligned in a direction parallel to the working surface. As a result, when the working surface engages a generally vertical workpiece, an air bubble is generally centered within the plumb vial. Similarly, when the working surface engages a generally horizontal workpiece, an air bubble is generally centered within the level vial.

Some currently known level tools also include means for clamping an end of the level to a workpiece so that a user can manipulate the workpiece without having to simultaneously hold onto the level, as shown in U.S. Pat. No. 6,839,973 and U.S. Pat. No. D509,158. For example, such a level tool may be used in the bending of electrical conduit, as described in U.S. Pat. No. 6,839,973. In a bending operation, it is desirable to secure the level to the end of the electrical conduit so that a user can bend the electrical conduit into a desired configuration and monitor the bending angles without having to simultaneously hold and manipulate the level. However, known level tools fail to provide the most effective and secure means for clamping an end of the level to a workpiece.

It is therefore desirable to provide an improved level tool that can be more securely clamped to a workpiece.

BRIEF SUMMARY

In one aspect of the present invention, there is provided a level tool comprising a body and a clamping portion disposed at one end of the body. The clamping portion includes a first arm having a plurality of spaced-apart contact surfaces and a second arm having a fastening member. The first and second arms define an opening for receiving a portion of a workpiece. The plurality of spaced-apart contact surfaces and the fastening member cooperate to releasably clamp the portion of the workpiece received in the opening.

In another aspect of the present invention, there is provided a level tool comprising a body and a pair of arms extending from one end of the body including first and second arms having oppositely facing interior surfaces that define an opening therebetween for receiving a portion of a workpiece. The interior surface of the first arm is shaped to have a plurality of co-planar, spaced-apart contact surfaces. A fastening member is operatively coupled to the second arm and releasably engages the portion of the workpiece against the contact surfaces.

Further objects, features, and advantages of the present invention will become apparent from consideration of the following description and the appended claims when taken in connection with the accompanying drawings.

BRIEF DESCRIPTION OF THE DRAWINGS

FIG. 1 is a top front perspective view showing a level embodying the principles of the present invention;

FIG. 2 is a front elevation view of the level shown in FIG. 1;

FIG. 3 is a top plan view of the level shown in FIG. 1;

FIG. 4 is a bottom plan view of the level shown in FIG. 1;

FIG. 5 is a front end view of the level shown in FIG. 1;

FIG. 6 is a rear end view of the level shown in FIG. 1;

FIG. 7 is a partial front end perspective view showing the clamping portion of the level shown in FIG. 1;

DETAILED DESCRIPTION

Figure 10:
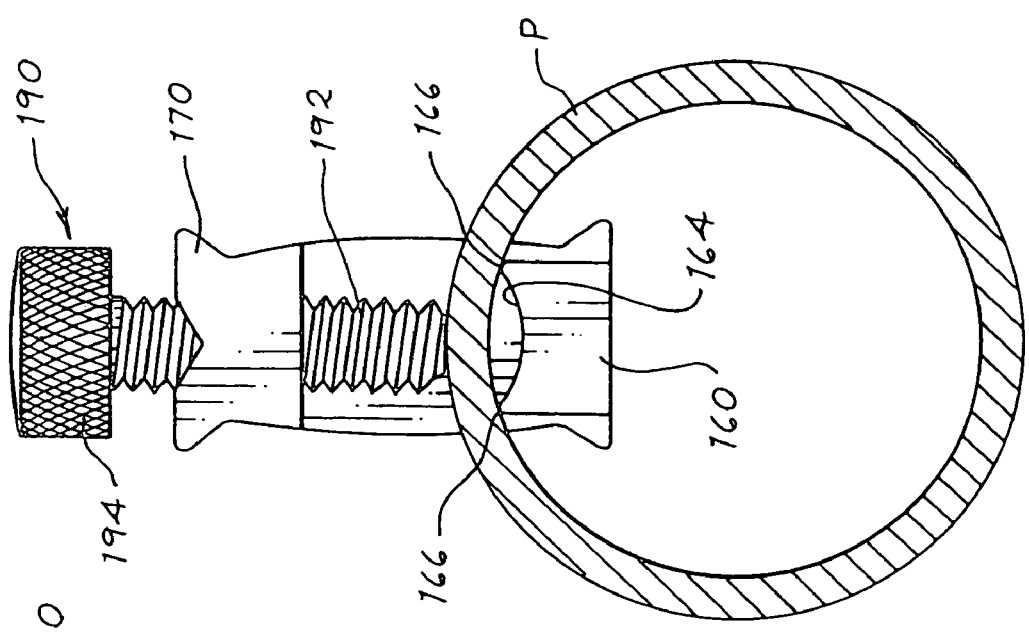
FIG. 10 is a front end view showing the level of FIG. 1 clamping to another workpiece.

Referring now to FIGS. 1-7, there is shown one embodiment of a clamping level in accordance with the principles of the present invention. In FIG. 1, the clamping level 100 includes an elongated body 110 having a clamping portion 150 disposed at a first end 112 thereof. As described in greater detail below, the clamping portion 150 is configured to releasably clamp the level 100 to a workpiece when the level tool 100 is used to indicate the orientation of the workpiece. The second end 114 of the body 110 opposite the clamping portion 150 has a rounded outer profile to facilitate portability and safety, although it will be understood that the second end can have any other shape suitable for these or other purposes.

In the present embodiment, the body 110 may be a generally solid member, except for openings, slots, passageways, and indentations formed or machined into or from the body 110, although it will be understood that the body 110 alternatively may be a generally hollow member having a frame-like structure. The body 110 preferably is made of an aluminum alloy, but any other suitable material may be used, such as other metal alloys and plastic or composite materials. The body 110 may have a generally I-shaped cross-sectional shape, as shown in FIGS. 1-7. However, it will be understood that the cross-sectional profile of the body 110 can have any other suitable shape, for example, a generally rectangular cross-sectional shape.

In particular, the body 110 includes a pair of top and bottom walls 116, 118 extending between oppositely facing ends 112, 114 and a pair of oppositely facing side walls 120, 122 extending between the top and bottom walls 116, 118. The top and bottom walls 116, 118 define, respectively, an upper and lower pair of opposing flanges 124, 126 that extend substantially completely along the longitudinal length of the body 110. If desired, distance marking indicia can also be formed along the lower pair of opposing flanges 126, for example, in metric and English units, and with numerals to indicate the distance away from a starting indicia on each of the flanges 126.

The body 110 also includes one or more parallel working surfaces 128 that are configured to contact a workpiece in a generally flush engagement for leveling the workpiece. In the present embodiment, at least a portion of one working surface 128 is defined by the outer surface of the bottom wall 118 that is parallel to the longitudinal axis of the body. Further, the top and bottom walls 116, 118 are preferably parallel with each other such that the outermost surface of the top wall 116 can define a portion of another working surface 128. Preferably, the working surfaces 128 are milled or otherwise machined to provide, for example, improved accuracy and level contact with a workpiece. In addition, the top wall 116 may include a V-shaped groove 117 that extends along the longitudinal length of the top wall to facilitate placement against a pipe or a conduit if desired.

A plurality of spaced-apart vial openings 130 are formed in the body 110, each of which receives and supports a vial 132 for indicating the orientation of a workpiece with respect to a reference axis. In the present embodiment, for example, the level tool 100 includes four vial openings 130, each having a vial 132 mounted therein so as to indicate the orientation of a workpiece with respect to a reference axis when one of the working surfaces engages the workpiece. In particular, the four vials 132 are positioned so as indicate the orientation of a workpiece with respect to a horizontal axis, a vertical axis, an axis that is oriented thirty (30) degrees relative to the horizontal axis, and an axis that is oriented forty-five (45) degrees relative to the horizontal axis. Each vial opening 130 extends completely through the body 110 between the side walls 120, 122 to allow a user to view the vials 132 from either side, as shown in FIGS. 1-2.

A plurality of passageways 134 are also formed in the body 110 such that at least one passageway 134 intersects each of the vial openings 130 and is axially aligned with the vial 132 to be positioned within the respective vial opening 130. The passageways 134 each have a diameter and shape corresponding to the diameter and shape of the vials 132 to allow the vials 132 to be inserted into the vial openings 130 through the passageways 134. The vials 132 each have a length sufficiently longer than the diameter of the vial openings 130 such that a first end of each vial 132 remains in one of the passageways 134 and is supported therein after the vial is inserted across the vial opening 130.

Each vial opening 130 also defines a bore surface 136 having an indentation 138 formed therein directly opposite the respective passageway 134 that intersects the vial opening 130. In this way, each indentation 138 is in alignment with a respective vial 132 and a respective passageway 134 for receiving and supporting the second end of the respective vial 132. The indentations 138 each have a diameter and shape corresponding to the diameter and shape of the vials 132 so that the second ends of the vials 132 securely rest directly against the body 110 within the vial openings 130 once the vials 132 are inserted into the vial openings 130. Although in the present embodiment the vials 132 are directly supported by the body 110 within the vial openings 130 via the indentations 138 formed in the bore surfaces 136 and the passageways 134, it will be understood that alternatively the vials 132 may be supported by inserts or other vial mounting assemblies that are mounted within the vial openings 130.

The body 110 also includes a plurality of viewing windows 140 formed in the top and bottom walls 116 and 118 and intersecting one or more of the respective vial openings 130. In this way, for example, when the working surface 128 defined by the outer surface of the bottom wall 118 engages a workpiece, a user can view one or more of the vials 132 while facing the top wall 116 through the viewing windows 140 formed in the top wall 116.

The body 110 further includes a plurality of plugs 142 for further securing the vials 132 within the vial openings 130, as shown in FIG. 3. The plugs 142 are each disposed within one of the passageways 134 to prevent the vials 132 from undesirably migrating through the passageways 134 during use of the level tool 100. Preferably, the plugs 142 are each configured to form an interference fit with the passageways 134, but the plugs 142 may be additionally or alternatively secured to the body 110 by an adhesive or other fastening means. The plugs 142 preferably are made of an organic polymer, for example polyethylene (PE), polypropylene (PP), or polyvinyl chloride (PVC), and have a substantially cylindrical cross-sectional shape. Alternatively, the plugs 142 may be made of glue, wax, silicone, or any other suitable material.

In addition, as shown in FIG. 4, the body 110 may support a plurality of magnetic inserts 146 for releasably securing the level tool to a ferrous component to be measured. For example, the magnetic inserts 146 are each positioned within a bore 148 formed in the bottom wall 118. The magnetic inserts 146 may be secured within the bores 148 through an interference fit or by an adhesive or other securing means. The magnetic inserts 146 are preferably of a type and size suitable for temporarily securing the level tool 100 to a ferrous component to be measured via a magnetic attractive force. More preferably, the magnetic inserts 146 each have an effective strength sufficient to collectively support the weight of the level tool 100 when the level tool 100 engages a vertically oriented ferrous workpiece, while not significantly hindering removal of the level tool 100 from the ferrous workpiece when desired.

As noted above, the clamping portion 150 is disposed at the first end 112 of the body 110 for releasably clamping the level 100 to a workpiece. In this embodiment, the clamping portion 150 is formed as a generally U-shaped section of the first end 112 of the body 110. In particular, the clamping portion 150 includes a pair of parallel, spaced-apart arms 160, 170 extending longitudinally from the central portion of the body 110 and an opening 180 defined therebetween. The opening 180 extends completely through the body 110 between the side walls 120, 122.

The first and second arms 160, 170 have exterior surfaces 162, 172 that are generally co-planar, respectively, with the bottom and top walls 118, 116 of the body. In this way, the exterior surfaces 162, 172 can also define portions of the working surfaces 128 such that each working surface 128 can contact a workpiece in a generally flush engagement for leveling the workpiece, as described above.

The first and second arms 160, 170 further have oppositely facing interior surfaces 164, 174 that define the opening 180. The spacing between the interior surfaces 164, 174 is made sufficiently large to receive a portion of a workpiece therebetween.

As described in greater detail below, the interior surface 164 of the first arm 160 is configured to securely hold a workpiece against a fastening member 190 that is threadably received in the second arm 170. In this embodiment, the interior surface 164 of the first arm 160 has a generally concave shape that defines a pair of co-planar, spaced-apart contact surfaces 166 for engaging a portion of a workpiece that is received in the opening 180. It will be understood, however, that the interior surface 164 of the first arm 160 may alternatively include one or more channels, troughs or any other suitable depressions extending parallel to the longitudinal axis of the first arm 160 so as to form at least one pair of co-planar, spaced-apart contact surfaces 166. For example, the interior surface 164 may alternatively include a V-shaped groove or a U-shaped channel forming a pair of spaced-apart contact surfaces 166. The contact surfaces 166 preferably are arranged in a plane parallel to the working surfaces 128 of the body 110 so that the vials 132 can also indicate the orientation of a workpiece held by clamping portion 150.

The second arm 170 includes a threaded opening 176 that extends completely therethrough in a direction perpendicular to the longitudinal axis of the body 110 at a location between the contact surfaces 166. A fastening member or thumbscrew 190 is provided that threadably engages the threaded opening 176. The thumbscrew 190 includes a shaft 192 having a complementary threaded portion and a knob member 194 attached to one end of the shaft. The knob member 194 may have a ribbed, knurled or otherwise roughened outer surface to allow a user to grasp and turn the thumbscrew 190. By turning the thumbscrew 190, the other end of the shaft 192 can be brought in and out of engagement with a workpiece.

As the thumbscrew 190 is tightened against a workpiece, the shaft 194 clamps the workpiece against the contact surfaces 166 of the first arm 160. Since the thumbscrew 190 is aligned in the threaded opening 176 along a perpendicular axis that extends between the contact surfaces 166, the clamping force being applied by the thumbscrew 190 in transferred laterally and is concentrated over the two contact surfaces 166. This arrangement generally provides at least three spaced-apart areas of contact between the clamping portion 150 and a workpiece that form a three-point support system or oblique triangle, thereby providing a mechanically stable configuration that helps to prevent the level 100 from moving, rotating, twisting or slipping relative to the workpiece. When the thumbscrew 190 is tightened sufficiently, a workpiece will be securely held between the thumbscrew 190 and the first arm 160, and will be held parallel to the level 100. When the thumbscrew 190 is turned in the opposite direction, it will release the level 100 from the workpiece.

In use, for example, the level 100 may be clamped to a cylindrical pipe or tubular conduit P by positioning one end of the pipe P over the first arm 160, i.e., the first arm is received within the interior of the pipe, and tightening the thumbscrew, as shown in FIG. 10. When viewed in cross-section, the two contact surfaces 166 of the first arm 160 engage the interior cylindrical wall of the pipe P at opposite locations corresponding to the ends of a chord extending across the wall of the pipe P in the plane of the contact surfaces 166. The thumbscrew 190 engages the exterior cylindrical wall of the pipe P at a location between the ends of the chord. As a result, the level 100 is securely clamped to the pipe P and is prevented from moving, rotating, twisting or slipping relative to the pipe P. Also, the level 100 is arranged parallel to the pipe, and thus can be used to indicate the orientation of the pipe P and monitor bending angles of the pipe.

Figure 9:
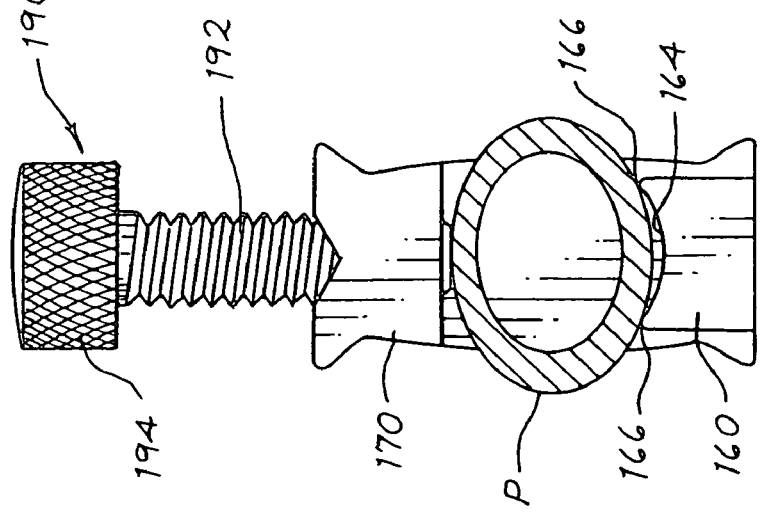
FIG. 9 is a front end view showing the level of FIG. 1 clamping to another workpiece.
Figure 8:
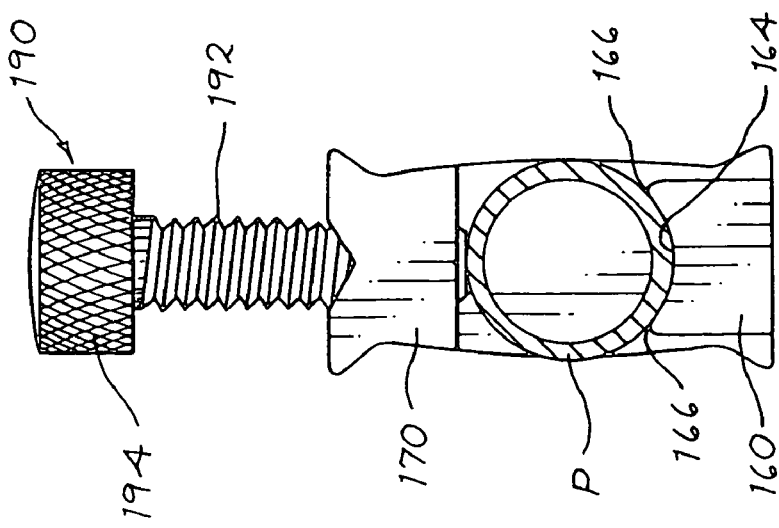
FIG. 8 is a front end view showing the level of FIG. 1 clamping to a workpiece.

In another example, the level 100 may be clamped to a pipe P having one end thereof positioned entirely between the arms 160, 170 of the clamping portion 150, as shown in FIGS. 8 and 9. FIG. 9 illustrates a pipe P having a wall portion with a radius of curvature greater than the radius of curvature of the concave interior surface 164 of the first arm 160. As a result, the two contact surfaces 166 and the thumbscrew 190 can engage the exterior wall of the pipe P in a way that provides a mechanically stable configuration. In particular, the two contact surface 166 can engage the exterior wall of the pipe P along the portion of the wall having a radius of curvature greater than the radius of curvature of the concave interior surface 164. In this way, the two contact surface 166 engage the exterior wall of the pipe P at opposite locations corresponding to the ends of a chord extending across the wall of the pipe P in the plane of the contact surfaces, while the thumbscrew 190 engages the exterior wall of the pipe P at a location between the ends of the chord. As a result, the level 100 is securely clamped parallel to the pipe P and is prevented from moving, rotating, twisting or slipping relative to the pipe P.

FIG. 8 illustrates a round pipe P having a radius of curvature about the same as or smaller than the radius of curvature of the concave interior surface 164 of the first arm 160. In this example, the generally concave interior surface 164 of the first arm 160 provides additional and/or alternate spaced-apart contact areas that engage and cradle a portion of exterior wall of the pipe P. In this way, the concave interior surface 164 of the first arm 160 supports the pipe P against lateral movement, while the thumbscrew 190 biases the pipe P against vertical movement, thereby providing a mechanically stable configuration. As a result, the level 100 is securely clamped parallel to the pipe P and is prevented from moving, rotating, twisting or slipping relative to the pipe P.

Further, it will be understood that the cylindrical pipe described herein is intended as illustrative rather than limiting and that, according to the present invention, other types of workpieces can be used in the operation of the clamping level 100. For example, the level 100 may be clamped to the edge of a generally flat workpiece, such as a sheet of metal or plywood, that is received entirely between the arms 160, 170 of the clamping portion 150. When the thumbscrew 190 is tightened, the pressure applied by the thumbscrew 190 is concentrated over the spaced-apart contact surfaces 166. As a result, the level 100 is securely clamped parallel to the flat workpiece and is prevented from moving, rotating, twisting or slipping relative to the flat workpiece.

In the present embodiment, the clamping portion 150 is integrally formed with the body 110. For example, the level tool 100 is preferably manufactured by machining an aluminum alloy billet into the general shape of the body 110, including the first arm 160 of the clamping portion 150 having a pair of co-planar, spaced-apart contact surfaces 166 for engaging a workpiece, the second arm 170 of the clamping portion 150 having the threaded opening 170, the vial openings 130, the viewing windows 140, the passageways 134, the indentations 138, and the groove 117. It will be understood, however, that the body 110 may be alternatively or additionally formed from an aluminum alloy by an extrusion process, casting process, or any other suitable process.

In another embodiment, the clamping portion 150 is formed separately from the body 110. For example, the clamping portion 150 may be formed separately as U-shaped member and fixedly attached to the first end 112 of the body 110. Alternatively, the U-shaped member forming the clamping portion 150 may be pivotally attached to the body 110 via a hinge, swivel, or other suitable pivoting means to allow the clamping portion 150 to rotate into different orientations, as described in U.S. Pat. No. 6,839,973.

While the present invention has been described in terms of preferred embodiments, it will be understood, of course, that the invention is not limited thereto since modifications may be made to those skilled in the art, particularly in light of the foregoing teachings.

What is claimed is:
1. A level tool comprising:
 a body; and
 a clamping portion disposed at one end of the body, the clamping portion including a first arm having a plurality of spaced-apart contact surfaces extending substantially along the longitudinal length of the first arm in a direc- tion parallel to the longitudinal axis of the body and a second arm having a fastening member, the first and second arms defining an opening for receiving a portion of a workpiece, the plurality of spaced-apart contact surfaces and the fastening member cooperating to releasably clamp the portion of the workpiece received in the opening.

2. The level tool of claim 1 wherein the contact surfaces are formed on a generally concave shaped interior surface of the first arm facing the opening and extending parallel to the longitudinal axis of the first arm.

3. The level tool of claim 2 wherein the generally concave shaped interior surface of the first arm is a generally V-shaped interior surface.

4. The level tool of claim 2 wherein the generally concave shaped interior surface of the first arm is a generally U-shaped interior surface.

5. The level tool of claim 2 wherein the contact surfaces are arranged in a plane that is generally parallel to a working surface of the body.

6. The level tool of claim 1 wherein the fastening member is threadably received in a threaded opening that extends completely through the second arm in a direction generally perpendicular to the longitudinal axis of the body at a location between the contact surfaces, wherein rotation of the fastening member in one direction causes the fastening member to clamp the portion of the workpiece against the contact surfaces.

7. The level tool of claim 6 wherein the clamping portion forms a generally U-shaped section of the body.

8. The level tool of claim 6 wherein the first arm and the second arm extend longitudinally from the body and are disposed generally parallel with each other.

9. The level tool of claim 6 wherein the body and the clamping portion are defined by a single, unitary construction made of an aluminum alloy, wherein the body has a generally I-shaped cross-sectional shape and a generally solid cross-section, wherein a second end of the body opposite to the one end of the body has a rounded outer profile, the level tool further comprising:
  a plurality of spaced-apart vial openings formed in the body;
  a plurality of level indicating vials mounted in the plurality of spaced-apart vial openings and directly supported by the body;
  a plurality of passageways formed in the body, wherein each one of the plurality of passageways intersects one of the plurality of spaced-apart vial openings and is axially aligned with one the plurality of level indicating vials to allow the plurality of level indicating vials to be inserted into the plurality of spaced-apart vial openings through the plurality of passageways;
  at least one viewing window formed in a wall of the body, the at least one viewing window intersecting at least one of the plurality of spaced-apart vial openings;
  a plurality of plugs securely mounted within the plurality of passageways for securing the level indicating vials within the vial openings; and
  a plurality of magnetic inserts disposed within bores formed in the body.

10. A level tool comprising:
  a body;
  a pair of arms extending from one end of the body including first and second arms having oppositely facing interior surfaces that define an opening therebetween for receiving a portion of a workpiece,
  wherein the interior surface of the first arm has a generally concave shape that extends parallel to the longitudinal axis of the first arm and the longitudinal axis of the body; and
  a fastening member operatively coupled to the second arm and releasably engaging the portion of the workpiece against the contact surfaces.

11. The level tool of claim 10 wherein the generally concave shape of the interior surface defines a plurality of co-planar, spaced-apart contact surfaces.

12. The level tool of claim 11 wherein the generally concave shape is a V-shape or a U-shape.

13. The level tool of claim 10 wherein the fastening member is threadably received in a threaded opening that extends completely through the second arm in a direction generally perpendicular to the longitudinal axis of the body at a location between the contact surfaces, wherein rotation of the fastening member in one direction causes the fastening member to clamp the portion of the workpiece against the contact surfaces.

14. The level tool of claim 13 wherein the first arm and the second arm extend longitudinally from the one end of the body and are disposed generally parallel with each other so as to define a generally U-shaped clamping portion of the body.

15. The level tool of claim 13 wherein the body and the clamping portion are defined by a single, unitary construction made of an aluminum alloy, wherein the body has a generally I-shaped cross-sectional shape and a generally solid cross-section, wherein a second end of the body opposite to the one end of the body has a rounded outer profile, the level tool further comprising:
  a plurality of spaced-apart vial openings formed in the body;
  a plurality of level indicating vials mounted in the plurality of spaced-apart vial openings and directly supported by the body;
  a plurality of passageways formed in the body, wherein each one of the plurality of passageways intersects one of the plurality of spaced-apart vial openings and is axially aligned with one the plurality of level indicating vials to allow the plurality of level indicating vials to be inserted into the plurality of spaced-apart vial openings through the plurality of passageways;
  at least one viewing window formed in a wall of the body, the at least one viewing window intersecting at least one of the plurality of spaced-apart vial openings;
  a plurality of plugs securely mounted within the plurality of passageways for securing the level indicating vials within the vial openings; and
  a plurality of magnetic inserts disposed within bores formed in the body.

16. A method of monitoring an orientation of a workpiece with respect to a reference axis using a level tool comprising a body, a vial supported by the body that is aligned with the reference axis, and a clamping portion disposed at one end of the body, the clamping portion including a first arm having a plurality of spaced-apart contact surfaces extending substantially along the longitudinal length of the first arm in a direction parallel to the longitudinal axis of the body and a second arm having a fastening member, the first and second arms defining an opening for receiving a portion of the workpiece, the plurality of spaced-apart contact surfaces and the fastening member cooperating to releasably clamp the portion of the workpiece received in the opening, the method comprising:
  positioning an end of the workpiece over the first arm such that the first arm is received within an opening defined by an interior cylindrical wall of the workpiece and the two contact surfaces of the first arm engage the interior cylindrical wall of the workpiece at opposite locations corresponding to the ends of a chord extending across the interior cylindrical wall in a plane of the contact surfaces;

tightening the thumbscrew against an outer surface of the workpiece to engage the outer surface at a location between the ends of the chord; and viewing the vial to monitor the orientation of the workpiece with respect to the reference axis.

17. The method of claim 16 wherein the generally concave shape is a V-shape or a U-shape.

18. The method of claim 16 wherein the fastening member is threadably received in a threaded opening that extends completely through the second arm in a direction generally perpendicular to the longitudinal axis of the body at a location between the contact surfaces, wherein rotation of the fastening member in one direction causes the fastening member to clamp the portion of the workpiece against the contact surfaces.

19. The method of claim 18 wherein positioning an end of the workpiece over the first arm comprises receiving a portion of the workpiece in a generally U-shaped section of the body formed by the clamping portion.

20. The method of claim 18 wherein in response to tightening the thumbscrew against an outer surface of the workpiece, there is provided a three-point support system having three spaced-apart areas of contact between the clamping portion and the workpiece which are arranged in the shape of an oblique triangle.

* * * * *

UNITED STATES PATENT AND TRADEMARK OFFICE
CERTIFICATE OF CORRECTION

PATENT NO. : 8,061,051 B2  Page 1 of 1
APPLICATION NO. : 12/114319
DATED : November 22, 2011
INVENTOR(S) : James S. Allemand It is certified that error appears in the above-identified patent and that said Letters Patent is hereby corrected as shown below:

In the Claims

In column 7, claim 9, line 50, after "aligned with one" insert --of--.

Signed and Sealed this
Twenty-eighth Day of February, 2012

David J. Kappos
*Director of the United States Patent and Trademark Office*